March 6, 1962   C. B. GRADY, JR   3,024,358
CONTAINER
Filed April 15, 1958
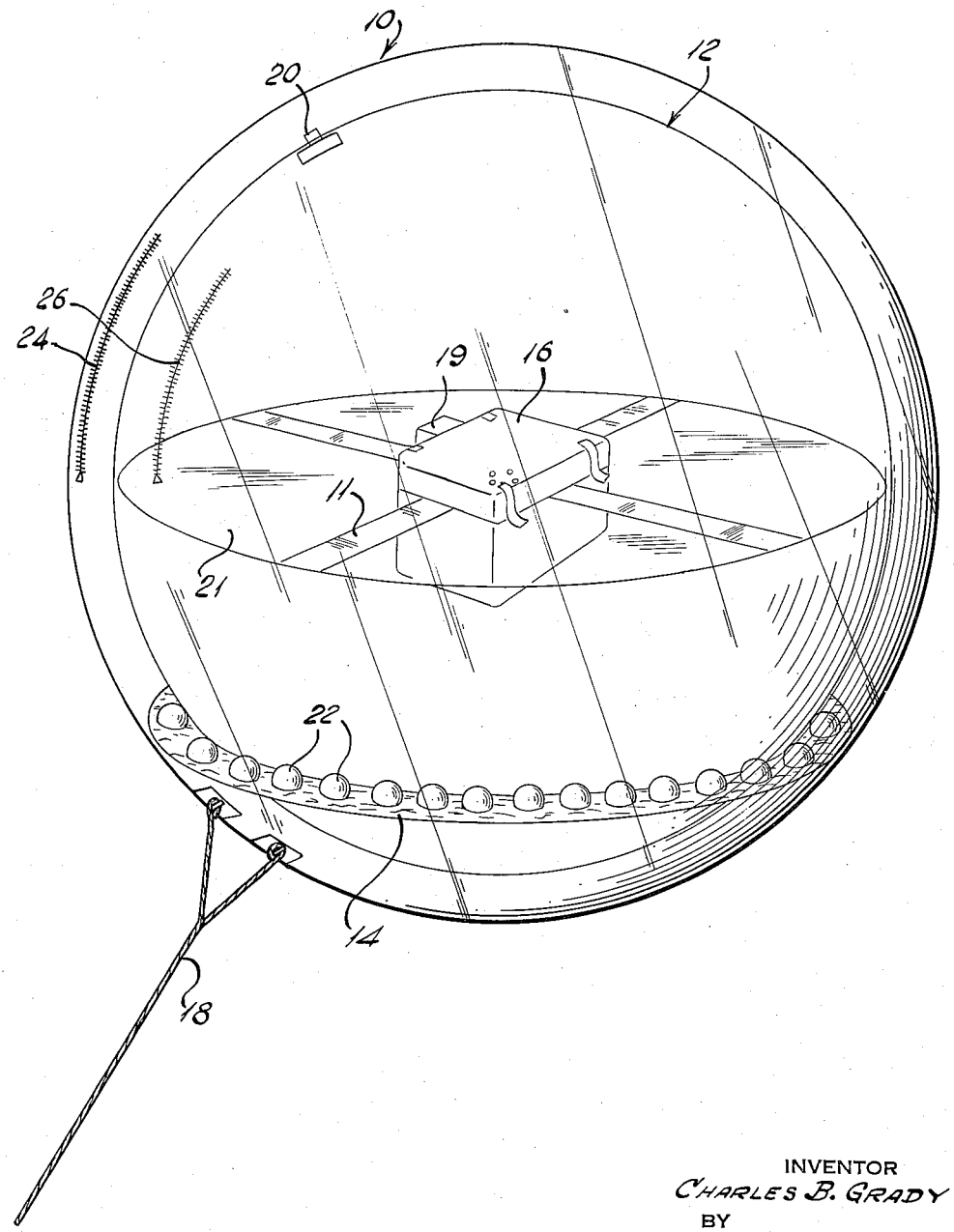
INVENTOR
CHARLES B. GRADY
BY
Moses, Nolte, & Nolte
ATTORNEYS 3,024,358
CONTAINER
Charles B. Grady, Jr., West Orange, N.J., assignor, jointly, to Maxson Electronics Corporation, a corporation of New York, and United States Rubber Company, New York, N.Y., a corporation of New Jersey
Filed Apr. 15, 1958, Ser. No. 726,069
4 Claims. (Cl. 250—17)

This invention relates in general to containers and more particularly to a new and useful light weight inflatable container particularly adapted for use in supporting a radio distress transmitter therewithin in an upright inner water tight compartment.

The present invention finds particular application for use with aircraft emergency kits which may be dropped from the aircraft immediately upon the happening of a disaster.

Radio transmitters of a type capable of transmitting a continuous distress signal must of necessity be supported within a liquid tight container, and preferably in an upright position in order to permit continued operation and good radio transmission. A container constructed in accordance with this invention includes two inflatable spheres, one within the other. The inner sphere is provided with a supporting membrane and for mounting supporting a radio transmitter and includes an inflation device for first inflating itself and thereafter causing inflation of an outer larger diameter enclosing sphere. Each sphere is made of a waterproof flexible material such as nylon fabric coated with neoprene. When stored in the aircraft it may be folded and wrapped around the radio transmitter and connected to a parachute for safe dropping purposes.

A feature of the invention is the inclusion of a liquid between the walls of the spheres which functions after inflation to provide a gimbal-type support for the inner sphere which floats on its gravitational center on the liquid of the outer sphere. The apparatus advantageously includes a plurality of small diameter floating resilient balls which float on the surface of the liquid within the outer sphere and function similar to a bearing race to keep the inner sphere centered and freely floating.

Accordingly it is an object of this invention to provide an improved water tight inflatable container.

A further object of the invention is to provide a container for a radio transmitter or the like including two spherical container portions, one within the other, the inner one of which floats on liquid held in the outer sphere, to permit the free rotation of the inner one an easy gravitational center.

A further object of the invention is to provide an aircraft emergency container which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawing:

The only FIGURE is a perspective view of an inflated spherical container for a radio distress transmitter constructed in accordance with the invention.

Referring to the drawings in particular, the invention as embodied therein includes an outer spherical portion generally designated 10 and an inner spherical portion generally designated 12, positioned therewithin and freely rotatable and movable in a bath of liquid 14 carried between the walls of each portion.

In accordance with the invention the spheres are preferably made of a resilient material such as a nylon impregnated with a neoprene or other similar rubber or resilient material. When in an aircraft the spheres are normally folded about a rectangular aircraft radio disaster transmitter 16. Upon the happening of a disaster to the aircraft, the container which may be secured to a parachute (not shown) by means of a line 18 is jettisoned from the plane.

The container includes an automatically operable inflation apparatus 19 which contains a pressurized gas cylinder (not shown). The inflation apparatus is effective to first inflate the inner sphere 12 to a predetermined pressure and then inflate the outer sphere 10 through a pressure relief valve 20 located in the wall of the inner sphere.

In the inflated position, the transmitter 16 is supported on a membrane 21 secured to the walls of the inner sphere 12 and is provided with antenna portions 11 encased in the membrane.

The inner sphere is freely rotatable and pivotable on the floating bath of liquid 14 to effect the steady positioning of a transmitter 16 within the sphere 12. This steady positioning of the transmitter 16 is particularly desirable in cases where the device lands on water and the motion of the waves would tend to move the antenna to many and varied positions and cause fading of the distress signals.

In order to insure that the inner sphere 12 is not forced into contact with the outer sphere 10 at any location, a plurality of resilient floating balls 22 are positioned between the spheres on the surface of the liquid.

Each of the spheres 10 and 12 are provided with waterproof gas tight zipper closures 24 and 26 respectively. The liquid bath used is preferably a fluid which is compatible with the rubberized material and standard aircraft hydraulic fluid has been found to be acceptable. In the present embodiment, the outer sphere is 39 inches in diameter and a quantity of liquid slightly in excess of 8 pounds has been found sufficient to support an inner sphere 12, including all the equipment therein, weighing approximately thirty pounds, based on a spacing of approximately one half inch between the spheres.

Thus, the invention provides an inflatable waterproof container for the storage of materials within an inner spherical portion thereof in a substantially steady and upright position unaffected by such disturbances as wave motions or the ground contour upon which the container rests. The invention is particularly applicable for use with aircraft disaster kits in which it is desired to jettison apparatus such as a SOS radio transmitter for the aircraft upon the happening of a disaster.

While a specific embodiment of the invention has been shown and described in detail to illustrate the application of the invention principles, it will be understood that the invention may be embodied otherwise without departing from such principles.

What is claimed is:

1. A waterproof container for supporting apparatus of the type described comprising collapsible and inflatable inner and outer portions, said portions assuming a spherical shape when inflated, a quantity of liquid in said outer portion, said inner portion freely floating on said liquid when said container is inflated, said inner container being adapted for supporting apparatus therein and for moving therewith relative to said outer portion when the container is inflated, said portions being foldable when collapsed for storage thereof, a plurality of balls being interposed between said inner and outer portions and float upon said liquid when said container is inflated and maintain said portions in spaced relation, pressurized inflationary means are carried within said inner portion, and a relief valve is disposed between said inner and outer portions.

2. In combination a resilient container and means to be supported therein, said container comprising collapsible and inflatable inner and outer portions, said portions assuming a spherical shape when inflated, said outer portion having liquid therein, said inner portion supported solely by the liquid in said outer portion when said portions are inflated, said means being supported within said inner portion with its center of gravity below the geometric center of said inner sphere whereby said means will assume, due to gravity, the same vertical axis irrespective of the position of the outer portion of the container relative to the inner portion.

3. In the combination of claim 2, wherein pressurized inflationary means are carried within said inner portion for inflating said portions.

4. In the combination of claim 3, including a relief valve between said inner and outer portions whereby after inflation of said inner portion to a certain inflation pressure the outer portion is inflated from said inner container.

References Cited in the file of this patent

UNITED STATES PATENTS

| | | |
|---|---|---|
| 1,679,675 | Lujan | Aug. 7, 1928 |
| 1,861,868 | Larson | June 7, 1932 |
| 1,912,358 | Bush | June 6, 1933 |
| 1,990,918 | Ramsden | Feb. 12, 1935 |
| 2,301,506 | Bean | Nov. 10, 1942 |
| 2,344,454 | Plotner | Mar. 14, 1944 |
| 2,397,844 | Dewhurst | Apr. 2, 1946 |
| 2,448,787 | Ferrel | Sept. 7, 1948 |
| 2,449,177 | Perry | Sept. 14, 1948 |
| 2,625,770 | Steen | Jan. 20, 1953 |
| 2,845,199 | Putman | July 29, 1958 |
| 2,885,565 | Davis | May 5, 1959 |
| 2,888,675 | Pratt | May 26, 1959 |

FOREIGN PATENTS

| | | |
|---|---|---|
| 311,426 | Germany | Mar. 21, 1919 |
| 134,234 | Great Britain | Nov. 6, 1919 |
| 390,690 | Great Britain | Apr. 13, 1933 |